Feb. 1, 1949.  B. W. KEESE  2,460,295
DRIVE AXLE
Filed March 11, 1944  6 Sheets-Sheet 1
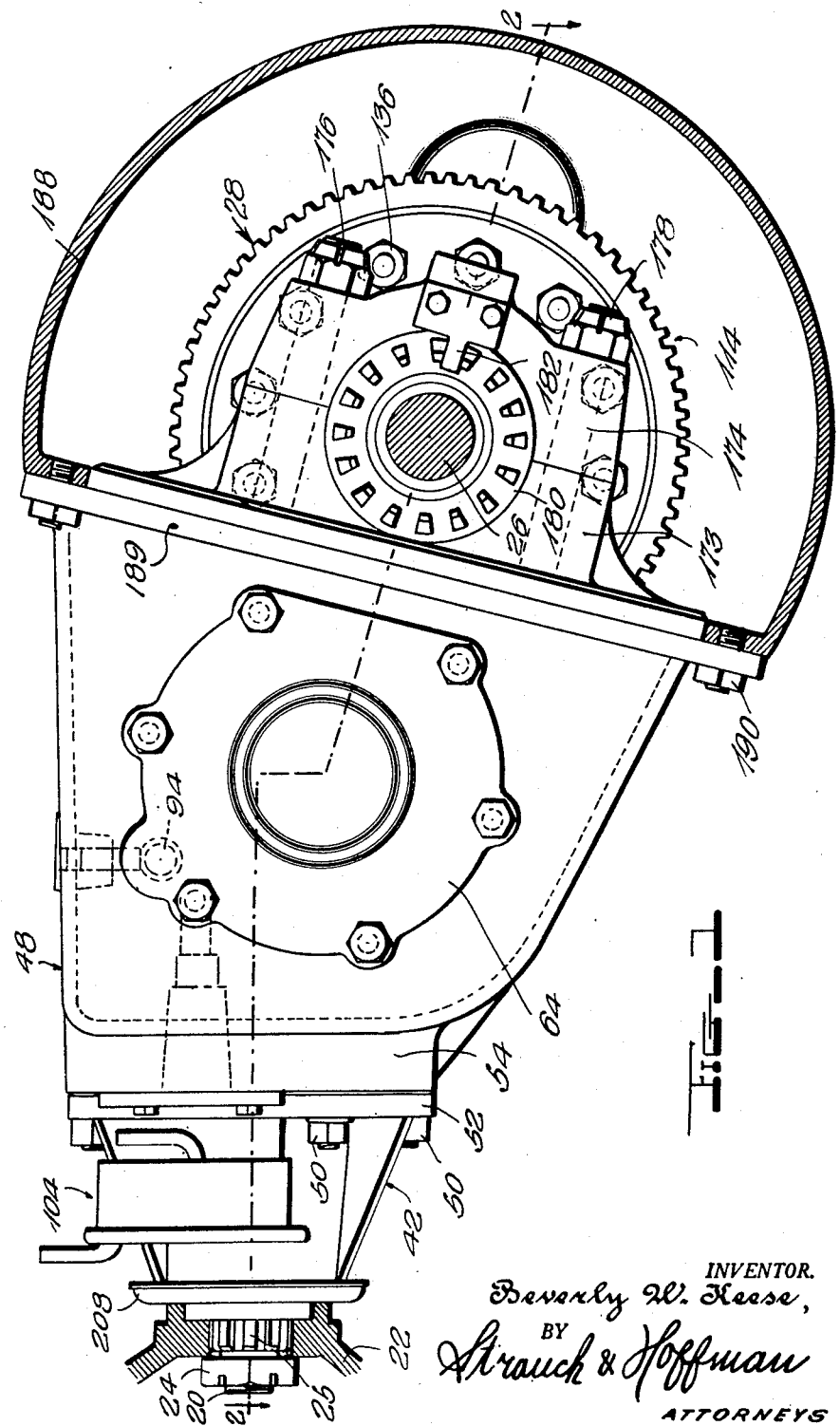
INVENTOR.
Beverly W. Keese,
BY
Strauch & Hoffman
ATTORNEYS Feb. 1, 1949.  B. W. KEESE  2,460,295
DRIVE AXLE
Filed March 11, 1944  6 Sheets-Sheet 2
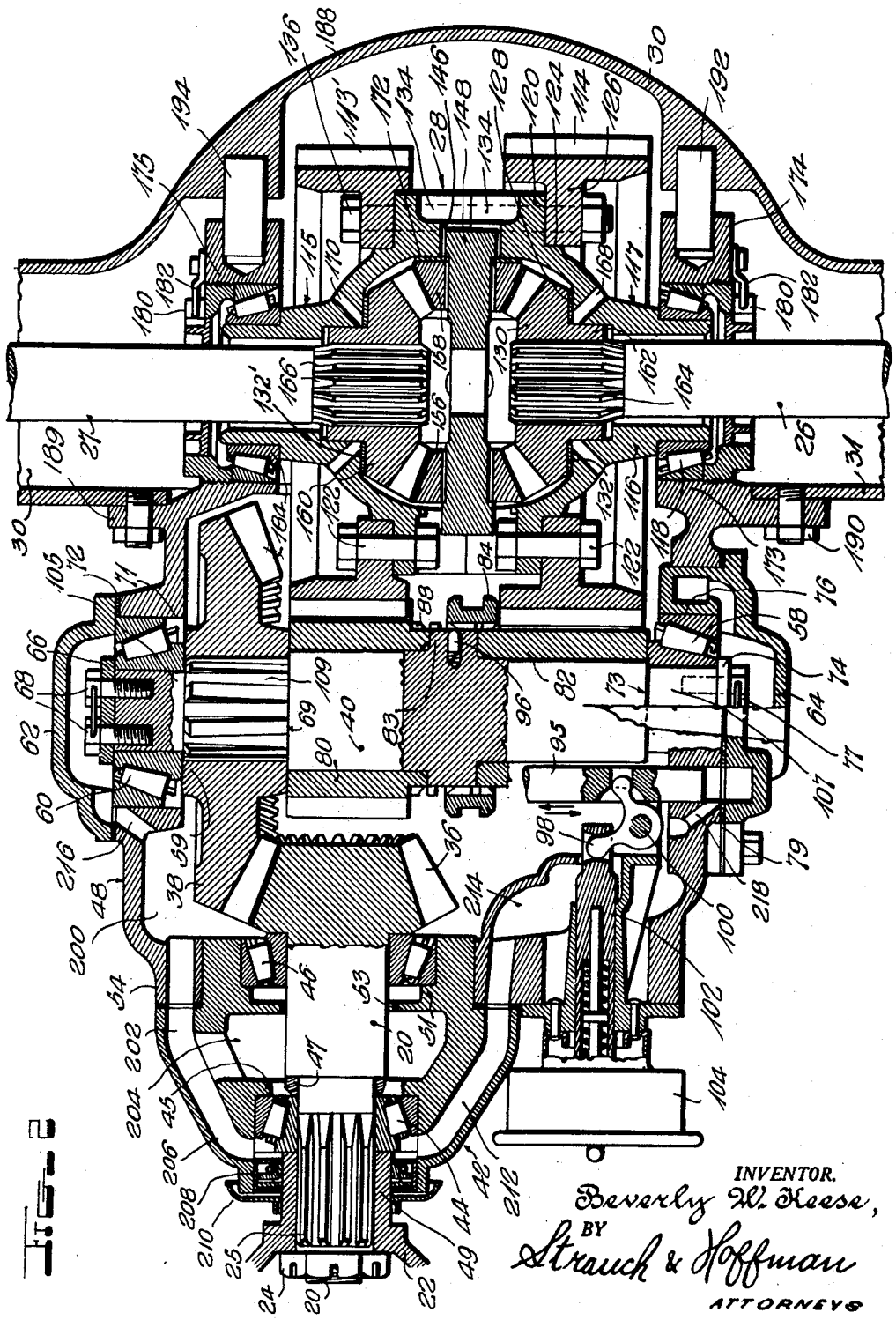
INVENTOR.
Beverly W. Keese,
BY
Strauch & Hoffman
ATTORNEYS

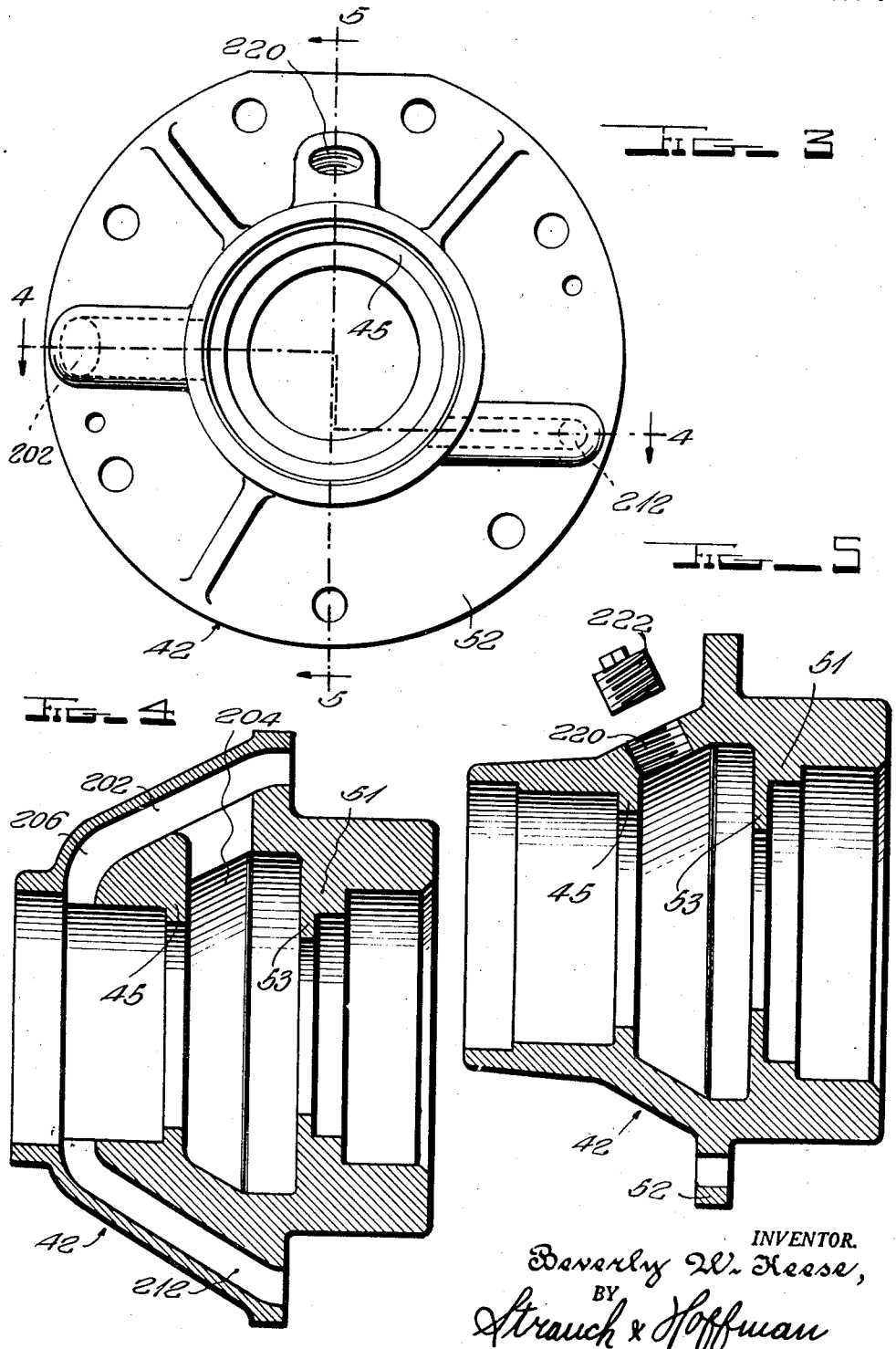

Feb. 1, 1949.  B. W. KEESE  2,460,295
DRIVE AXLE
Filed March 11, 1944  6 Sheets-Sheet 4
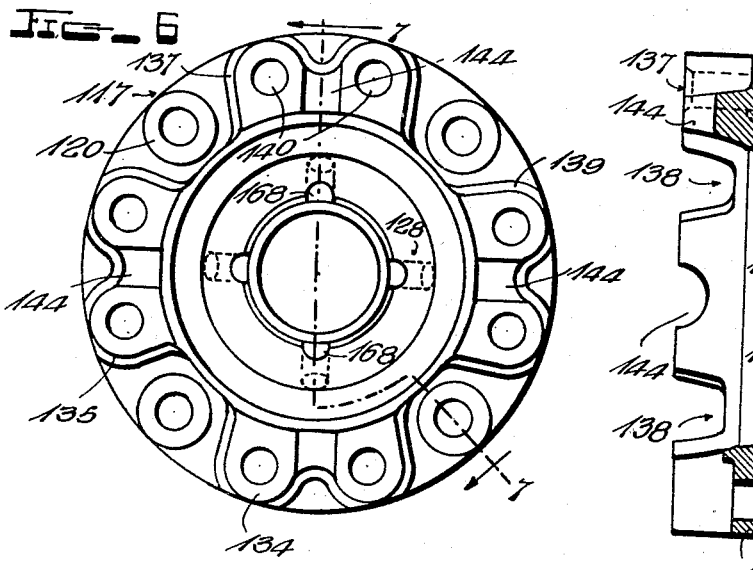
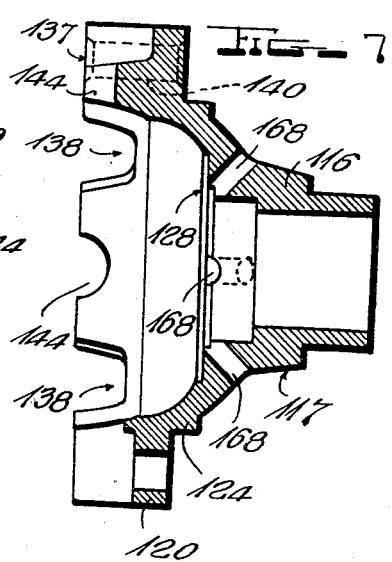
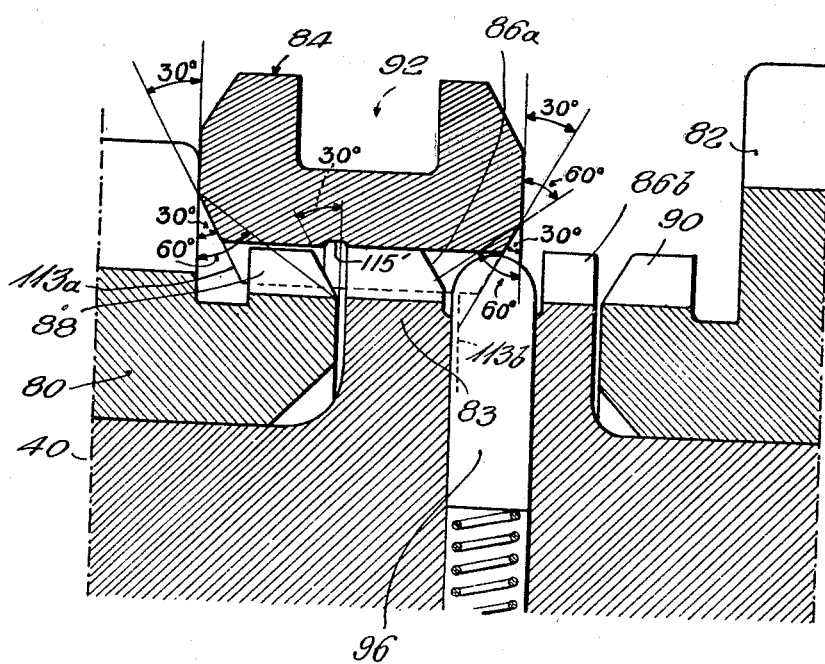
INVENTOR.
Beverly W. Keese,
BY
Strauch & Hoffman
ATTORNEYS

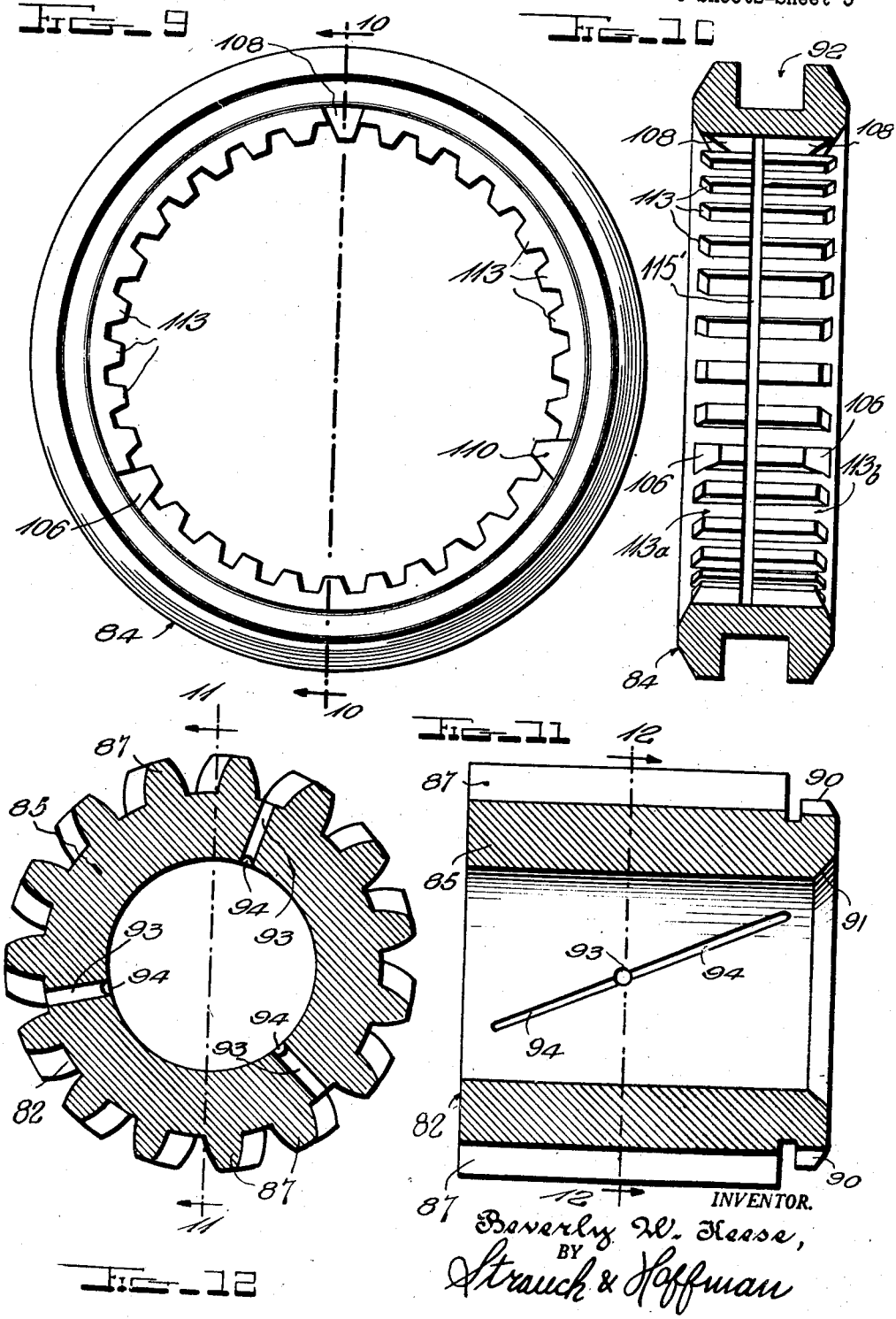

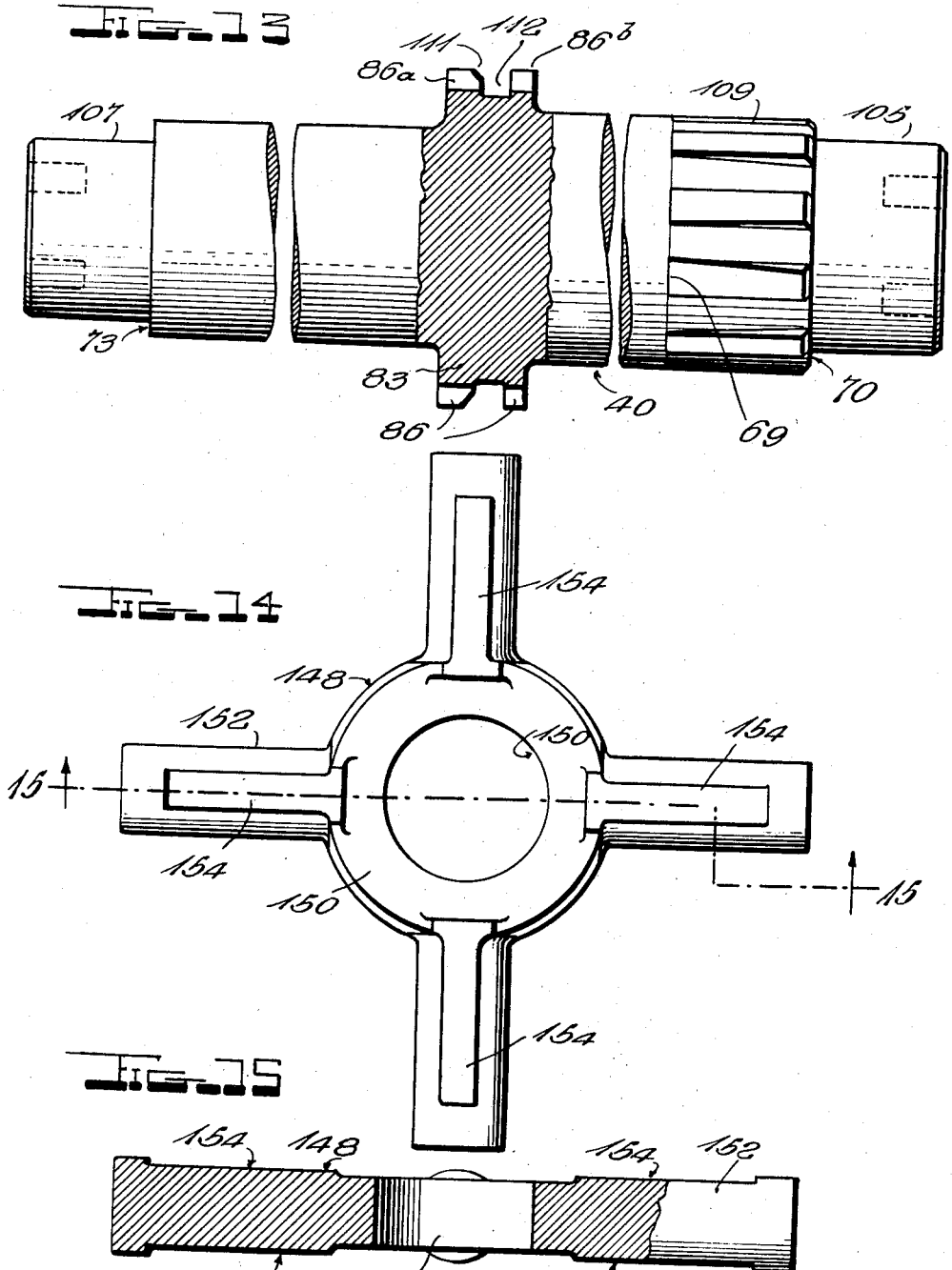

Patented Feb. 1, 1949

2,460,295

UNITED STATES PATENT OFFICE 2,460,295

DRIVE AXLE

Beverly W. Keese, Oshkosh, Wis., assignor to The Timken-Detroit Axle Company, Detroit, Mich., a corporation of Ohio Application March 11, 1944, Serial No. 526,044

4 Claims. (Cl. 74—327)

This invention relates to improvements in drive axles for motor vehicles and has particular reference to improvements in double reduction axles such as are disclosed in United States Patent Number 2,183,667, issued December 19, 1939, to L. R. Buckendale and the United States Letters Patent No. 2,383,954, issued to Buckendale et al., and has for its principal object the provision of a simplified axle construction especially of the two-speed, double reduction type, of improved design, reduced manufacturing cost and greater rigidity and durability.

In previous two speed, double reduction axles it has been customary to form the differential cage of two dissimilar members, usually of cast metal to reduce production cost. I have found, however, that by simplifying these cage members and making them alike, they can be made as forgings from the same dies at no material increase in cost and are much stronger, lighter and more accurate. Also, when such members are formed as forgings large areas can be left open, because of the increased strength of the material, to permit the free flow of lubricant into and out of the differential cage, and because of the high strength of the bolt lugs, relatively large bolts can be used and placed under heavy initial tension load to provide a strong and rigid connection between the two parts of the cage.

In the larger two speed, double reduction axle units it is advantageous to form the differential cage portions and the cage driving gear elements separately and secure them together with a simple through bolt arrangement using a relatively small number of large diameter bolts. By doing this the two portions of a differential cage can be formed from substantially identical forged blanks or blanks formed in the same forging die thus reducing the manufacturing cost and much smaller repair or replacement stocks need be maintained. Since the gear elements are of considerably different diameter it is considered more economical to use different blanks for the two elements to reduce machining and metal waste to the minimum, and complete repair or replacement stocks of each size of gear have to be maintained in any event. The improved connection between the gear element and the cage portion, comprising a few large diameter through bolts, renders it particularly easy to replace the gear elements when necessary especially since some of the bolts have a low tolerance body fit that properly positions the gear relative to the differential cage.

In the larger units there is ample room for gear connecting bolts of adequate size so that nothing of value is lost in weight saving or over-all size in making the cage portions and the gear elements separate.

The differential pinion gear spider may be clamped firmly in position and the gear elements held in proper meshing relationship and adequately lubricated.

Lubrication of the stub shaft and cross shaft bearings of the two speed axle has also been improved since, with the hypoid arrangement used to raise the stub shaft and reduce the angularity of the propeller shaft, these bearings are above the normal lubricant level in the gear housing. By utilizing the pumping effect of the bevel gear train between the power input stub shaft and the cross shaft and providing lubricant receiving pockets and channels leading from the pockets to the various bearings, an adequate supply of lubricant to the bearings is assured.

In the preferred embodiment of my invention the locating planes between the gear carrier and housing have been tilted at an angle to the axis of the propeller shaft to raise the propeller shaft above the axle shafts and reduce the overhang of the gear carrier case, and dowel connections are provided between the conventional housing and the adjacent portion of the differential bearing caps, providing added pilots and strengthening elements between the gear carrier and the axle housing. As the tilted or inclined locating planes are more difficult to machine than normal planes, the reinforcing dowel connections provide a highly desirable condition of rigidity between the gear carrier case and the axle housing in larger size axles which permits use of smaller parts and less overhang without sacrificing rigidity of construction.

The improved two speed axle construction of the present invention therefore has several advantages in the provision of a stronger and more rigid differential component, adequate lubrication of the stub shaft and cross shaft bearings in combination with a hypoid arrangement of the bevel gear train drivingly connecting these shafts and location of both of these shafts above the differential axis, and in the provision of a rigid connection between the gear carrier case having an inclined attachment flange, and the axle housing.

It is therefore a further object of the invention to provide a two speed, double reduction drive axle of the character indicated having an improved differential cage construction of substantially symmetrical form comprising two similar cage parts.

A still further object resides in the provision of an improved vehicle drive axle having a differential mechanism provided with highly effective lubricating means operative to supply adequate quantities of lubricant to the components of the mechanism with a minimum of fluid friction.

An additional object resides in the provision of a vehicle drive axle of the character indicated having an axle housing and a gear carrier casing with improved means for joining the gear carrier to the housing to secure increased rigidity of the construction and greater load carrying capacity.

Another object resides in the provision of a two speed, double reduction drive axle including a hypoid bevel gear train which, in the case of a rear drive axle, reduces the angularity of the propeller shaft relative to the vehicle transmission.

Other objects and advantages will be more particularly pointed out hereinafter or will become apparent as the description proceeds.

The novel lubrication system of this axle is disclosed and claimed in my copending divisional application Serial No. 610,704 filed August 14, 1945. The novel clutch structure of this axle is disclosed and claimed in my copending divisional application Serial No. 634,904 filed December 14, 1945.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken in a limiting or restrictive sense, since it will be apparent to those skilled in the art that various changes in the illustrated embodiment may be resorted to without in any way exceeding the scope of the invention.

In the drawings,

Figure 1 is a side elevation view of a two speed, double reduction vehicle axle constructed according to the invention and arranged for use as a rear axle in a conventional type vehicle, a portion being broken away and shown in sections to better illustrate the construction thereof;

Figure 2 is a transverse sectional view taken on the line 2—2 of Figure 1 looking in the direction of the arrows;

Figure 3 is an end elevational view of the front or small end of the gear carrier casing looking from the left hand end of Figure 2.

Figure 4 is a sectional view on the line 4—4 of Figure 3.

Figure 5 is a sectional view on the line 5—5 of Figure 3.

Figure 6 is an elevational view of a member constituting one half of the differential housing illustrated in Figure 2.

Figure 7 is a sectional view on the line 7—7 of Figure 6.

Figure 8 is a sectional view on an enlarged scale showing the arrangement of the clutch mechanism illustrated in Figure 2.

Figure 9 is a side elevational view of the movable clutch element shown in Figure 2.

Figure 10 is a sectional view on the line 10—10 of Figure 9.

Figure 11 is a detailed longitudinal sectional view of one of the two speed drive gears shown in Figure 2 with which the clutch member shown in Figure 8 cooperates.

Figure 12 is a transverse sectional view on the line 12—12 of Figure 11.

Figure 13 is a detailed elevational view on an enlarged scale of the cross shaft upon which the two drive gears shown in Figure 2 are mounted.

Figure 14 is an elevational view of the differential gear spider; and

Figure 15 is a transverse sectional view on line 15—15 of Figure 14.

Referring to the drawings in detail and particularly to Figure 1, 20 indicates an axle driving, engine driven stub shaft to which the vehicle propeller shaft is drivingly connected by means of the universal joint flange 22 secured on shaft 20 by nut 24 and drivingly connected through splines 25, and numerals 26 and 27 indicate vehicle axle shafts which extend from the vehicle differential, generally indicated at 28, through the axle housing load carrying arms 30 and 31 to operative driving connections with the vehicle wheels in a manner known to the art.

Stub shaft 20 carries a bevel pinion gear 36 which meshes with a bevel ring gear 38 mounted on a cross shaft, or countershaft generally indicated at 40, upon which are mounted change speed gears which mesh with gears on the differential housing and are selectively connectable with the ring gear 38 by means of a clutch, all as hereinafter described in detail.

The gears 36 and 38 are hypoid gears; that is, the rotational axis of pinion gear 36 does not pass through the rotational axis of ring gear 38, the teeth on both gears being cut at an angle to compensate for the fact that the two gears do not have a common cone center.

In the ordinary hypoid differential, known to the art, the axis of the pinion is disposed below the rotational axis of the ring gear, this relationship of the gear axes being necessary in view of the direction of rotation of the gears in order that the driving force may be exerted between the pressure sides of the gear teeth. Otherwise the gears, as manufactured at present, will not stand up in service since the gear teeth do not make full contact on the concave side of the teeth and rapid wear would take place if it were attempted to drive the gears in a manner such that the driving pressure were exerted on the concave sides of the gear teeth. In the double reduction axle illustrated, however, the direction of rotation of the ring gear is opposite from that in the conventional single reduction differential because of the inter-position in the gear train of the change speed intermediate gears. In a double reduction rear axle arrangement, by locating the axis of rotation of the pinion gear above the axis of rotation of the ring gear, as is clearly illustrated in Figure 1, the proper meshing of the hypoid gears is secured and at the same time a desirable elevation of the propeller shaft above the horizontal plane of the axle shafts is secured. Where the double reduction axle is employed as a front axle however, the direction of rotation of the ring gear is reversed because of the opposite direction of the propeller shaft, and it then becomes necessary in a double reduction axle mechanism to dispose the axis of the pinion gear below the axis of the ring gear and in this arrangement the propeller shaft is beneficially lowered to clear the front mounted engine. Otherwise the same arrangement of component parts of the invention may be employed for a double reduction rear axle as for a double reduction front axle.

The double reduction two speed axle gear mechanism is particularly illustrated in assembled relationship in Figures 2 and 3 and details of the more important component parts are shown in Figures 4 to 15, inclusive, to which reference may now be had for a detailed description of the mechanism.

The stub or propeller shaft, section 20, is rotatably mounted in an end casing, generally indicated at 42 by means of the spaced apart anti-friction bearing assemblies, generally indicated at 44 and 46, which are preferably tapered roller bearings capable of resisting axial loads on the stub shaft as well as lateral or radial forces.

Outer race of bearing 44 bears at the end facing bearing 46 against the outer edge of a rib 45 formed in front housing portion 42 while the inner race bears at the corresponding end against a spacer ring 47 interposed between the bearing and a shoulder on shaft 20. The outer end of the inner race abuts the inner end of apertured boss portion 49 of universal joint flange 22 so that tightening nut 24 places the inner race and spacer ring 47 in compression. Outer race of bearing 46 rests at its inner side against a rib 51 formed internally in casing portion 42 and provided with an annular extension 53 the inner edge of which is slightly spaced from shaft 20 to control the flow of lubricant to bearing assembly 46. The inner race of bearing 46 abuts at its outer end against a shoulder formed on the back side of pinion 36. With this arrangement, tightening nut 24 moves the inner races of bearing assemblies 44 and 46 toward each other and preloads and adjusts the bearing assemblies to avoid end play of shaft 20.

The front housing portion 42 (Figure 1) is secured to the open front end of the main gear carrier case, generally indicated as 48, by means of suitable cap screws or stud bolts, as indicated at 50 in Figure 1, extending through an annular flange 52 provided on the front casing and into an annular boss 54 formed on the end of the main casing.

Cross shaft 40 (Figure 2) is mounted at its opposite ends in anti-friction bearing assemblies generally indicated at 58 and 60 disposed in suitable apertures in the side walls of the main case 48 which apertures are closed by suitable cover plates 62 and 64 circumferentially bolted to the main case. Inner race of bearing assembly 60 abuts at its inner end against the adjacent end of a shaft receiving boss portion 59 of bevel gear 38 and at its outer end against the outer circumferential portion of end plate 66 secured to the end of cross shaft 40 by cap screws 68. Tightening the cap screws 68 forces gear 38 against the shaft shoulder 69, sufficient clearance for this purpose being provided between the bearing inner race and the adjacent end of taper spline section 109. Outer race of bearing assembly 60 is slidably received in bearing aperture 71 in main casing 48 and bears at its outer end against a shoulder formed internally of cover plate 62, a shim washer 72 being preferably interposed between the cover plate and the surface of main casing 48 surrounding aperture 71.

The inner race of bearing assembly 58 bears at its inner end against annular shaft shoulder 73 and at its outer end against the outer portion of end plate 74 secured to shaft 40 by cap screws 77. Outer race of bearing assembly 60 is slidably received in bearing aperture 76 and bears at its outer end against a shoulder formed internally of cover plate 64, a shim washer 79 being preferably interposed between the cover plate and the portion of casing 48 surrounding aperture 76.

With this arrangement preloading and adjustment of the bearing assemblies to eliminate end play of shaft 40 may be accomplished by decreasing the thickness of one or both shim washers, and endwise movement of the shaft to adjust gear 38 relative to gear 36 may be accomplished by changing the thickness of both shim washers. Use of the end plates 66 and 74 permits the use of a short cross shaft and greatly facilitates assembly and disassembly of the device.

The two intermediate gears 80 and 82 are rotatably mounted on the cross shaft one upon each side of the center portion thereof and are held against substantial axial movement by the radial enlargement 83 intermediate the length of shaft 40 and by end contact with gear 38 and the inner race of bearing assembly 58. Slidable clutch member 84 surrounds the shaft between the two gears 80 and 82.

One of the intermediate gear members, for example the gear 82, is illustrated in detail in Figures 11 and 12 wherein the gear is shown as comprising a generally cylindrical body portion 85 having upon the exterior thereof the spirally arranged gear teeth 87 and at one end the chamfered clutch teeth 90. The inner end of the gear is interiorly bevelled, as indicated at 91 to clear the adjacent fillet on the cross or counter shaft and lubricant is forced through the radial apertures 93 by the teeth of the meshing differential drive gear to slots 94 which distribute the lubricant around the bearing surface. The amount of lubricant for the gears 80 and 82 is relatively small since the gears rotate on the cross shaft only when idling and when operating under load are connected to the cross shaft by the clutch member and do not rotate relative thereto.

The angle of the spiral gear teeth is carefully selected to balance, so far as possible, end thrust on the differential and to absorb the greatest possible amount of the end thrust on cross shaft 40 occasioned by the operation of bevel gears 36 and 38.

Annular clutch member 84, illustrated in detail in Figures 9 and 10, is provided with internal spline teeth 113 which mesh with spline teeth 86 on cross shaft 40, illustrated in detail in Figure 13, and which are selectively engageable with clutch teeth 88 and 90 on the inner ends of gears 80 and 82, respectively. The annular clutch member is provided externally with an annular groove 92 in which yoke fingers carried by a shift rod 95 engage to shift the clutch member into engagement with either set of gear clutch teeth 88 or 90 or to its neutral position in which it is free of the clutch teeth of both gears 80 and 82.

Shift rod 95 is operated by a suitable mechanism, such as the bell crank 98 pivotally supported on the fixed pin 100 and having one arm engaged in the shift rod and the other arm engaged in a shaft 102 operatively connected with a pneumatic or vacuum actuator generally indicated at 104, carried on the outside of the main housing 48. The shift rod, bell crank shaft and pneumatic actuator may be any one of the types illustrated and described in application Serial No. 501,172 filed September 3, 1943, by Ivor H.

Williams and Ralph K. Super for Power transmitting mechanism or may be of some other form especially devised or known to the art. By this arrangement either gear 80 or 82 may be drivingly coupled through shaft 40 with ring gear 38, or both gears may be rotationally free of the bevel gear, in which case no driving force is transmitted through the axle mechanism.

The clutch member is resiliently held in engagement with either gear member by means of spring pressed detents, one of which is indicated at 96, carried in the cross shaft 40 and engageable with chamfered tooth end surfaces at each side of the clutch member. Preferably there are three such detents, spaced at 120 degree intervals around the cross shaft and three internal clutch member teeth as indicated at 106, 108 and 110 in Figure 9, having specially chamfered end surfaces for cooperation with corresponding detents. End surfaces inclined approximately 60 degrees from a plane normal to the axis of rotation of the clutch member, as particularly shown in Figure 8, have been found to give entirely satisfactory results.

The remaining teeth are provided with inclined end surfaces inclined 30 degrees from a plane normal to the axis of rotation of the clutch member.

As is particularly shown in Figure 10, the internal clutch teeth 113 are divided into two sets, 113a and 113b by an annular groove 115' intersecting all of the internal teeth. Corresponding teeth of the two sets have the same pitch but the teeth of set 113b are longer and a few thousandths of an inch thinner than the teeth of set 113a.

The cross shaft 40, particularly illustrated in Figure 13, has two end journal portions 105 and 107 terminated by annular shoulders. In the form illustrated, the right hand journal portion 105 is larger than the journal portion 107 and takes a larger anti-friction bearing assembly to adequately support the loads occasioned by the adjacency of the ring gear 38 mounted on the splined shaft portion 109.

It will be noted that an annular groove or channel 112 intersects the spline clutch teeth 86 and that the teeth portions on opposite sides of this channel are of different width, the wider portions at the left hand side of the channel having their ends facing the channel in a conical surface inclined approximately 60 degrees to the axis of rotation of the shaft, as indicated at 111. The teeth are provided on the periphery of annular flange or extension 83 which is connected to the main portion of the shaft by fillets of relatively large radius in order not to weaken the center portion of the cross shaft by permitting stress concentration. The shaft carried clutch teeth 86 are divided by the annular groove 112 into two sets as indicated at 86a and 86b of which corresponding teeth are in alignment and are of the same thickness with the result that the inter-tooth spaces of the two sets are also of the same width.

With the clutch tooth arrangement as above described in connection with the clutch member 84 and cross shaft or counter shaft 40, when the clutch member is in engagement with clutch teeth 88 of gear 80 as shown in Figure 8, and under torque load in either direction, the thin teeth 113b will have sufficient clearance between the teeth 86a to cause the thick teeth 113a to overlap at their ends along the groove 115', the outer unchamfered ends of teeth 86a thus positively locking the clutch member in operative position when under torsional load. Similarly, when the clutch member is in position to engage clutch teeth 90 of gear 82 the thin teeth 113b will have sufficient clearance between the teeth 86b to cause the thick teeth 113a to overlap at their outer inclined ends the inner inclined end portions of teeth 86a adjacent groove 112 and positively lock clutch member 84 in operative position when under torsional load.

For a more detailed description of the clutch locking arrangement disclosed in United States Letters Patent No. 2,398,407 issued April 16, 1946, to Nelson R. Brownyer.

The ends of the clutch teeth 88 and 90 on the respective gears 80 and 82 facing the clutch member are also provided with end surfaces inclined thirty degrees to the plane of the end face of the gear, as illustrated in detail in Figure 8, the edges of the inclined ends of these teeth also being left square and sharp in the manner indicated in the Brownyer patent, supra. These sharp edges provide positive, quick and easy shifting of the clutch member as particularly pointed out in the Brownyer patent while the 30 degree inclination of the end surfaces facilitates the shifting by providing a self-centering action for the clutch member and increased overlapping lock areas between the thick teeth on the clutch member and the cross shaft teeth when the clutch is in high speed driving position and provides somewhat stronger teeth by permitting a longer tooth base with the same amount of travel of the clutch member.

Intermediate gears 80 and 82 are provided with peripheral teeth which mesh with peripheral teeth on respective annular gears 113' and 114 secured to the differential cage of the mechanism.

The differential cage comprises two identical members shown in section in Figures 2 and 7 and in elevation in Figure 6. The two members, as generally indicated at 115 and 117, are similar in all respects so that a detailed description of only one is considered necessary for the purpose of this disclosure, the member 117 being selected for this purpose.

The member 117 has a substantially cylindrical journal portion 116 surrounding but out of contact with the corresponding axle shaft 26 (Figure 2) and this journalled portion is provided externally at its end with an annular surface to receive the inner race of an anti-friction bearing assembly generally indicated at 118. At the inner end of the hollow boss 116 the member 117 has a portion of somewhat partly spherical form which leads up to annular flange or web 120 (Figures 2 and 7) apertured to receive a plurality of bolts, as indicated at 122, which secure the gear member 114 to member 117. Adjacent the outer side of the flange or web 120, the member 117 is provided with an annular shoulder 124 which constitutes a pilot and rest for the inner edge of the web or flange 126 of spur gear member 114. Internally, the member 117 is provided with a radial annular surface 128 lying in a plane substantially perpendicular to the axis of the axle shaft 26 and a bevel differential side gear 130 is disposed in the member 117 with a radial surface parallel and adjacent to the surface 128, a bearing washer or thrust plate 132 being interposed between the gear 130 and the adjacent surface of the member 117.

Upon the side of the flange or web 120 opposite the boss 116 the member 117 is provided with angularly spaced apertured bosses as indicated at 134, 135, 137 and 139. The end surfaces of the apertured bosses on the two members 115 and 117 are in contact when the two members are in assembled relationship and through bolts, one of which is indicated at 136, extend through the apertures of corresponding bosses to rigidly secure the two half portions of the differential cage securely together.

As is clearly indicated in Figure 6, there are four of the apertured bosses spaced around the web portion of the member 117. The portion of the member 117 between adjacent bosses is cut away, as indicated at 138 in Figure 7, to provide openings through the differential cage through which lubricant may flow in and out to lubricate the differential and spider gears mounted within the cage. Each of the bosses is provided with two spaced apart apertures, as indicated at 140 for the boss 137, which apertures receive corresponding through bolts for securing the two portions of the differential cage together and also securing the gear elements to the differential cage. Some or all of these bolts have a close body fit in the apertures through which they pass and serve as dowels to properly locate the two cage portions and the gear elements rotationally relative to each other as well as acting to secure the elements together.

There are eight of these through bolts in the form of differential illustrated, all of relatively large diameter so that they may be placed under heavy initial tension load.

Between the bolt apertures each lug is provided with a radially extending cylindrical half aperture as indicated at 144. When the two cage members 115 and 117 are assembled these half apertures are aligned to provide radial apertures, as indicated at 146 in Figure 2, within which the arms of a four armed spider, generally indicated at 148, are secured.

Four additional bolts, as indicated at 122, are used to connect each gear element to the differential cage. These are shorter bolts and extend only through the web or flange of the cage portion and the web or flange portion of the corresponding gear element. Some or all of these bolts may also have a low tolerance fit in the apertures through which they pass in order to act as dowels for accurately locating the corresponding gear element on the differential cage.

With this arrangement all loads on the bolts act entirely in shear and there are no forces tending to bend or spring the bolts to cause hardening thereof and no wear on the bolts such as would tend to cause loosening of the connection.

The two bolt receiving apertures in each boss are so arranged that a bolt is located at each side of the spider arm receiving aperture providing a strongly reinforced construction supporting the spider. A spider particularly designed for the differential herein disclosed is illustrated in detail in Figures 14 and 15.

Spider member 148 comprises an integral, cross-shaped, member having a generally circular center portion 150 with flat sides and four arms projecting from the center portion and spaced 90 degrees apart. Each arm comprises a journal portion 152 for a respective differential pinion gear and an end portion for mounting in the differential cage. Each of the journal portions is provided along two sides with flats, as indicated at 154 and 155, which permit lubricant to flow from the center of the spider member into the bearings between the journal portions of the spider arms and the respective differential pinion gears. This spider member is piloted only in the differential cage and does not pilot the differential pinion gears radially of the cage, the gears being supported for this purpose on bearings formed internally of the cage.

The spider member carries four differential pinion gears, two of which are indicated at 156 and 158 in Figure 2, which mesh with the side gear 130 and with the similar side gear 160 supported in the cage member 115. Each of the side gears 130 and 160 has an extended journal portion, as indicated at 162 for the gear 130, extending into an annular recess in the cage member 117 adjacent the gear supporting radial bearing 132, and the gears are secured to the respective axle shaft by suitable spline connections as indicated at 164 and 166, respectively. A lubricant aperture for the bearing 132 is indicated at 168 and a similar aperture in the cage member 115 is indicated at 170 for the bearing 132.

This construction provides a simple and extremely rigid differential mechanism the parts of which require relatively few machining operations and the assembly of which is simple and can be accomplished in a minimum of time. The mechanism is so manufactured that no adjustment of the differential gears is necessary other than the bearing washers or shim plates, as indicated at 128, 132 and 132' for the gears 130 and 160 and the similar washers or plates, as indicated at 172, disposed between the outer sides of the differential pinion gears and adjacent bearing surfaces provided within the differential cage members surrounding the apertures 146 which receive the ends of the spider arms.

The outer race of bearing 118 is secured in an annular aperture one half of which is formed in bearing leg 173 integral with the main gear carrier case 48 and the other half of which is formed in a semi-circular bearing cap 174, secured to the main case by two stud bolts, indicated at 176 and 178 in Figure 1. The bearing 118 is held within this aperture and is pre-loaded by means of a ring nut 180 screw threaded into the aperture and locked in position by a suitable tongue 182 bolted to the case and projecting into one of a series of notches formed in the outer end of the ring nut. The bearing 184 for the cage member 115 is mounted in a similar aperture and is secured in position and pre-loaded by a ring nut 186 similar to the ring nut 180 and locked into position by similar means. End play of differential 28 may be eliminated by tightening ring nuts 180 and 186.

It has been found that a very rigid gear carrier and axle housing construction can be provided by placing the annular flange connection between the carrier and the housing in a substantially vertical plane. It is desirable, however, particularly in large size, heavy duty, short coupled tractor units, to tilt the flange connection to a plane extending upwardly and rearwardly relative to the vehicle in order to reduce the overhang of the gear carrier case and raise the axle end of the propeller shaft to reduce its angularity and consequent wear on the propeller shaft universal joints, particularly in the case of a short coupled vehicle such as a tractor unit to which large size semi-trailers are attached.

When the flange connection is thus tilted some of the rigidity between the gear carrier and axle housing is lost because it is not possible to provide as accurate machining of the face of the flange and because the torque reaction and twisting forces have components that are not parallel to the flange face.

The flange 189 of the gear carrier case 48 is secured to the axle housing by suitable means, such as the bolts 190.

By providing the dowels 192 and 194 between the gear carrier and the housing adjacent the apex of a cone of which the flange connection constitutes the base, the rigidity of the construction is greatly increased, relieving both the moving parts and the housing from excessive stresses and permitting the use of lighter components.

These dowels extend from the bearing caps 174 and 175 into sockets provided interiorly of the rear cover member 188.

The front casing, generally indicated at 42, and particularly illustrated in Figures 3 and 4, has, as its principal function, the support of the bearings 44 and 46 mounting the stub shaft 20. It also, however, provides channels and passages for supplying lubricant to these bearings, particularly in the case of a high mounted hypoid, as illustrated in Figure 1, where the lubricant does not tend to flow from the bowl and the main case to these bearings.

In the forward portion of the main casing 48 there is provided a lubricant receiving pocket 200 into which lubricant is directed by the pinion gear 36 when rotating. Some of this lubricant is led forwardly through channel 202 into the space 204 between the bearings 44 and 46 and through a branch channel 206 to the space ahead of the bearing 44.

Bearing assemblies 44 and 46 exert a definite pumping action on the lubricant when shaft 20 is rotating, both bearing assemblies tending to force the lubricant in a direction from the smaller to the larger ends of the tapered rollers. Thus both bearings draw lubricant from the inter bearing space 204 when this space is adequate supplied and rib extension 53 prevents the bearing assembly 46 from pumping at a too rapid rate such as might rob assembly 44 of adequate lubrication.

While lubricant from space 204 is normally sufficient to lubricate both bearing assemblies, we have considered it desirable to provide a branch channel 206 leading directly to the space between bearing assembly 44 and oil seal 208 to insure adequate lubrication of the front bearing assembly at times when, because of low speed or insufficient lubricant in space 204, the quantity of lubricant pumped through bearing assembly 44 might be inadequate. A lubricant return is provided by the passage 212 which leads into a pocket 214 on the opposite side of the pinion gear from the pocket 200. The pocket 214 may also receive lubricant from the pinion gear 36, excess lubricant overflowing into the main case from this pocket. A passage 216 leads from the pocket 200 to the roller bearing 60 which supports the corresponding end of the cross shaft, to lubricate this bearing, and a similar passage 218 leads from the pocket 214 to the anti-friction bearing 58.

Leakage of the lubricant from the case is prevented by oil seal assembly 208 mounted in the end of the casing and surrounding cylindrical boss on universal joint flange 22. This flange carries dish-shaped ring member 210 which overlies the front end of the casing 42 and oil seal 208 to protect the bearing between the oil seal and member 22 from grit, water and other foreign matter which might otherwise enter along the portion of the universal joint flange extending into the casing.

Front casing 42 is provided in the top portion thereof with a screw threaded opening 220 normally closed by a plug 222, opening into the inter-bearing space 204. After draining the axle mechanism, sufficient lubricant may be introduced through this opening to insure that bearing assemblies 44 and 46 do not run dry at any time as when the mechanism is put into operation immediately after draining and refilling.

Thus all of the anti-friction bearings supporting the stub shaft and the cross shaft are insured of an adequate supply of lubricant and the gears within the differential housing or casing are supplied with adequate lubricant through the dipping action of the cut away portions of the differential cage members. The bearings 118 and 184 which support the differential housing are adequately lubricated by being partly immersed in the main body of lubricant which is contained in the rearward part of the main casing and in the cover or bowl 188.

There is thus provided a simplified and improved drive axle construction having distinct advantages over known and previously proposed devices of the same general character and one which provides a strong and durable mechanism at an exceptionally low manufacturing cost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, an axle housing, a pair of axle shafts rotatably mounted in said axle housing, an auxiliary housing secured to said axle housing, a countershaft in said auxiliary housing parallel to and above said axle shafts, gear means and shiftable clutch means for transmitting power at different speed ratios from said countershaft to said axle shafts, the axis of said countershaft being displaced from a vertical plane containing the axis of said axle shafts, an engine driven shaft perpendicular to said axle shafts rotatably mounted in said auxiliary housing at a higher level than said countershaft, and gear means comprising meshed hypoid bevel gears for transmitting power from said driven shaft to said countershaft.

2. In a drive axle, an axle housing, oppositely disposed aligned axle shafts in said housing, a series of rotatable means within said housing for transmitting power to said axle shafts, said means being mounted for rotation about axes that are successively stepped at higher levels than said axle shafts and comprising a drive shaft located at a materially higher level than said axle shafts, a countershaft intermediate the levels of said drive and axle shafts and having its axis parallel to but spaced from the vertical plane containing the common axis of said axle shafts, meshed hypoid gears interconnecting said drive shaft and said countershaft, and drive means interconnecting said countershaft and axle shaft comprising means for selectively driving said axle shafts at a plurality of different speeds.

3. In a multi-speed double reduction drive axle, a differential mechanism cage rotatably journalled about a first axis, a rotatable cross shaft having its axis parallel to a vertical plane containing said first axis but displaced from said plane and disposed at a higher level than said first axis, a pinion shaft rotatable about an axis perpendicular to said plane and vertically displaced to lie above the axis of said cross shaft, a pinion on said pinion shaft, a ring gear non-rotatably mounted on said cross shaft and meshed constantly with said pinion, a pair of intermediate gears of different size journalled on said cross shaft, a pair of cooperating gears on said cage constantly meshed with said intermediate gears, and means for selectively drive connecting said cross shaft to one or the other of said intermediate gears for driving said differential cage at different speeds.

4. In a two-speed double reduction drive axle, a gear carrier casing having parallel legs, aligned bearings in said legs and a differential cage rotatably supported by said carrier casing comprising substantially similar cage halves bolted together with a differential pinion supporting spider clamped between them and having opposite end bosses mounted in said bearings, gears of different size rigid with the respective cage halves, a cross shaft journalled in the carrier casing parallel to the axis of said bearings but displaced forwardly and at a higher level than the axis of said bearings, a hypoid ring gear rigid with the cross shaft, spaced gears of different size rotatably mounted on said cross shaft and constantly meshed with said gears on the cage, a clutch collar non-rotatably mounted on said cross shaft but slidable therealong to connect either of said spaced gears for rotating with said cross shaft, a pinion shaft rotatably mounted on said carrier casing at a higher level than said cross shaft and substantially perpendicular thereto, and a hypoid pinion on said pinion shaft constantly meshed with said ring gear.

BEVERLY W. KEESE.

REFERENCES CITED

The following references are of record in the file of this patent:

UNITED STATES PATENTS

| Number | Name | Date |
|---|---|---|
| 877,267 | De Valbreuze | Jan. 21, 1908 |
| 1,382,278 | Foote | June 21, 1921 |
| 1,629,518 | Martin | May 24, 1927 |
| 1,768,481 | Kelley | June 24, 1930 |
| 1,828,025 | Church | Oct. 20, 1931 |
| 2,015,108 | Harper | Sept. 24, 1935 |
| 2,016,343 | Oberem | Oct. 8, 1935 |
| 2,070,140 | Peterson et al. | Feb. 9, 1937 |
| 2,120,594 | Alden | June 14, 1938 |
| 2,147,145 | Carlson | Feb. 14, 1939 |
| 2,147,146 | Carlson | Feb. 14, 1939 |
| 2,180,962 | Ormsby | Nov. 21, 1939 |
| 2,183,667 | Buckendale | Dec. 19, 1939 |
| 2,204,287 | Wilber | June 11, 1940 |
| 2,350,459 | Hillcoat et al. | June 6, 1944 |
| 2,351,590 | Alden et al. | June 20, 1944 |
| 2,383,954 | Buckendale et al. | Sept. 4, 1945 |

FOREIGN PATENTS

| Number | Country | Date |
|---|---|---|
| 11,511 | Great Britain | 1907 |
| 407,465 | Great Britain | Mar. 22, 1934 |
| 690,382 | Germany | Apr. 24, 1940 |
| 838,869 | France | Dec. 16, 1938 |